(12) United States Patent
Bagwell (10) Patent No.: US 9,494,787 B1
(45) Date of Patent: Nov. 15, 2016

(54) DIRECT VIEW ZOOM SCOPE WITH SINGLE FOCAL PLANE AND ADAPTABLE RETICLE

(71) Applicant: Sandia Corporation, Albuquerque, NM (US)

(72) Inventor: Brett Bagwell, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 420 days.

(21) Appl. No.: 13/797,607

(22) Filed: Mar. 12, 2013

(51) Int. Cl.
*G02B 23/00* (2006.01)

(52) U.S. Cl.
CPC .................... *G02B 23/145* (2013.01)

(58) Field of Classification Search
CPC ............... G06K 7/10831; G06K 2207/1012; B41J 2202/20; B41J 2/04505; G06F 17/30675; G06F 21/57; G06F 12/1408; G06F 17/30321; G06F 17/30424; G06F 21/72; G06F 21/73; G06F 11/0715; G06F 11/0751; G06F 17/30684; G06F 17/360687; G06F 17/30864; G06F 21/123; G06F 21/76; G06F 21/85; G06F 2221/2101; G06F 2221/2103; G06F 3/04845; G06F 9/466; G06F 17/50; G06F 21/00; G06F 21/445; G06F 21/606; G06F 21/608; G06F 21/71; G06F 9/44526; G02B 23/145; G02B 23/14; G02B 15/04; G02B 7/10; G02B 15/177; H04L 67/2842; H04L 67/2876; H04L 9/083; H04L 9/12; H04L 9/3213; H04L 9/3236; H04L 9/3066; H04L 9/3247; H04L 9/3271; H04L 2209/60; H04L 63/0227; H04L 63/0263; H04L 63/107; H04L 67/18; H04L 9/0662; H04L 9/0877; H04L 9/3215; H04L 9/3239; H04L 9/3252; H04L 9/3263; H04L 9/3273; H04L 2209/043; H04L 2209/125; H04L 2209/20; H04L 41/065; H04L 41/0856; H04L 41/22; H04L 67/2804; G06Q 10/06; G06Q 10/04; G06Q 10/0833; G06Q 20/14; G06Q 30/0283; G06Q 50/08
USPC .................................................. 359/421–729
See application file for complete search history.

(56) References Cited

U.S. PATENT DOCUMENTS 3,672,782 A * 6/1972 Akin, Jr. ................ G02B 27/32
356/251
3,902,251 A * 9/1975 Ross .............................. 42/122
(Continued)

OTHER PUBLICATIONS

Wikipedia, The Free Encyclopedia, "Telescopic sight," Internet download on Aug. 30, 2012, pp. 1-17.

*Primary Examiner* — Bumsuk Won
*Assistant Examiner* — Henry Duong
(74) *Attorney, Agent, or Firm* — Blakely, Sokoloff, Taylor & Zafman, LLP (57) ABSTRACT

A direct view telescopic sight includes objective lens, eyepiece, and prism erector assemblies. The objective lens assembly is mounted to receive light of an image from an object direction and direct the light along an optical path. The eyepiece assembly is mounted to receive the light along the optical path and to emit the light of the image along an eye-ward direction. The prism erector assembly is positioned between the objective lens and eyepiece assemblies and includes first and second prism elements through which the optical path passes. The first and second prism elements invert the image. A reticle element is disposed on or adjacent to a surface of one of the first or second prism elements to combine a reticle on the image. The image is brought into focus at only a single focal plane between the objective lens and eyepiece assemblies at a given time.

23 Claims, 6 Drawing Sheets

(56) References Cited

U.S. PATENT DOCUMENTS

| | | | | |
|---|---|---|---|---|
| 4,255,013 A | * | 3/1981 | Allen | F41G 1/38 356/247 |
| 4,806,007 A | | 2/1989 | Bindon | |
| 5,191,470 A | * | 3/1993 | Wickholm | G02B 25/001 359/375 |
| 5,241,335 A | * | 8/1993 | McIntyre | 396/86 |
| 6,977,777 B1 | | 12/2005 | Wick | |
| 7,124,531 B1 | * | 10/2006 | Florence | F41A 17/08 42/111 |
| 7,551,219 B2 | * | 6/2009 | Monroe | G02B 13/16 348/217.1 |
| 7,926,219 B2 | * | 4/2011 | Reimer | F41G 1/38 42/1.02 |
| 8,074,394 B2 | * | 12/2011 | Lowrey, III | F41C 27/22 42/123 |
| 8,314,994 B1 | * | 11/2012 | Thomas | G02B 23/145 359/676 |
| 8,582,964 B2 | * | 11/2013 | Toguchi | G03B 3/10 396/77 |
| 2005/0219690 A1 | * | 10/2005 | Lin et al. | 359/429 |

* cited by examiner

ADAPTIVE ZOOM MODULE
(TELEPHOTO SETTING – NARROW FOV & HIGH MAGNIFICATION)

FIG. 4A

ADAPTIVE ZOOM MODULE
(INVERTED TELEPHOTO SETTING – WIDE FOV & LOW MAGNIFICATION)

DIRECT VIEW ZOOM SCOPE WITH SINGLE FOCAL PLANE AND ADAPTABLE RETICLE

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to the field of optics, and in particular but not exclusively, relates to telescopic sights, commonly referred to as "scopes."

BACKGROUND INFORMATION

A telescopic sight, also referred to as a scope, is a device equipped with a graphic image pattern (referred to as a reticle) that is used to provide an accurate aiming point. The object light from the external scene under observation is combined with the reticle and both the object light and the reticle are presented to the user's eye as a combined image. Telescopic sights are often mounted to guns or used in standalone glassing devices, such as monocular or binocular seeing eyeglasses.

Scopes come in two types—direct view scopes and non-direct view scopes. In a "direct view" scope, the object light that enters the eye is the light that originates from the external scene under observation and passes through the various internal optical elements of the scope to the eye. In contrast, a non-direct view scope is a scope that includes intermediate image capture of external object light (e.g., via a camera) and subsequent re-generation and display of the object image. The original external scene light does not pass through to the user's eye.

Figure 1:
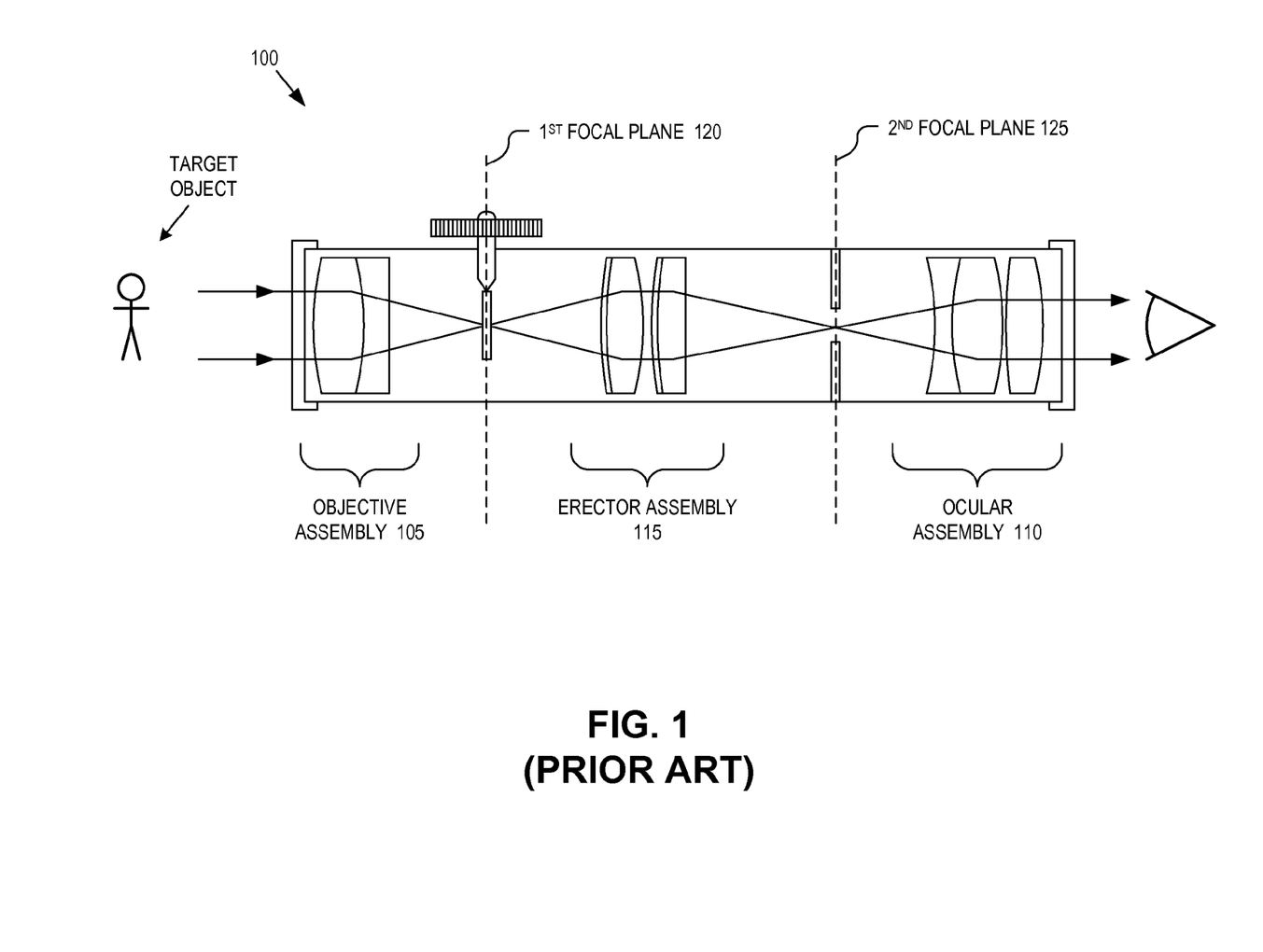
FIG. 1 (Prior Art) is a functional block diagram illustrating a conventional dual focal plane direct view scope.

FIG. 1 illustrates a conventional direct view scope 100 that includes an objective assembly 105, which faces the object under observation in the external scene, and an ocular assembly 110, which faces the user's eye. Since objective assembly 105 inverts the object image, in order to present an upright object image to the user's eye, direct view scope 100 includes an erector assembly 115 disposed between objective assembly 105 and ocular assembly 110. Erector assembly 115 operates to re-invert the object image.

Direct view scope 100 includes two focal planes: first focal plane 120 and second focal plane 125. These are planes were the object image is brought into focus by the optical assemblies of direct view scope 100. The first focal plane (FFP) 120 is positioned between objective assembly 105 and erector assembly 115 while second focal plane (SFP) 125 is positioned between erector assembly 115 and ocular assembly 110. Since the object image is brought into focus at both of these planes, a reticle can be positioned at either focal plane.

On a variable power telescopic sight, an FFP reticle expands and shrinks along with the object image as magnification is adjusted while on a SFP the reticle remains the same size and shape while the object image appears to grow or shrink. As such, most variable power scopes are SFP. A significant disadvantage of a variable power SFP is that the proportions between the reticle and object target are dependent upon a selected magnification. In other words, angular meaning of the reticle is not constant across the different magnifications. This is a significant drawback for range-finding reticles that have mil-dots or hash markets. Although FFP reticle scopes do not introduce magnification related errors, the same reticle must be used for all magnifications. A reticle that is well suited for high magnification, may not be well suited for low magnification and vice versa.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an apparatus and method of operation of direct view zoom scope with a single focal plane and adaptable reticle are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments described herein disclose techniques for a direct view telescopic zoom sight that can incorporate more than one reticle type and/or adjust the reticle so that the reticle maintains constant angular meaning relative to the target object while changing the magnifying power. These features enable the reticle pattern to be tailored for a specific engagement range (conjugate), mission profile, and magnifying power (MP). Typically, the choice of which reticle to use is dictated by the range at which it is to be used and the mission profile for which it will be used. In a zoom rifle scope, this is related to the MP. In close quarters battle, such as an urban environment, a red dot or a cross-hair reticle is common. At longer ranges it is desirable to have the ability to make stadia-metric range estimations, bullet drop compensations, and wind compensations. This requires a so-called mil-dot based reticle, which includes calibrated reference marks (e.g., hash marks). These reference marks often include milli-radian interval lines positioned in the field of view ("FOV").

Conventional zoom rifle scopes have two intermediate focal planes (see FIG. 1). These are planes where light comes to a focus and creates a real image. This is where reticles are placed. The reticle may be a wire reticle, an etched reticle, or a holographic reticle. The real image of the target is superimposed on the reticle, and both are then re-imaged and presented to the eye. With a dual focal plane design, if one desires to have two different etched reticles, both would need to be located at respective intermediate focal planes. However, both reticles would always be in focus creating a confused image. Alternatively, if a holographic reticle and a long-range etched reticle were used at respective focal planes, then it is possible to turn the holographic reticle off for long range shots. However, with the holographic reticle on it is not possible to turn the etched reticle off for close shots. Again, confusion is created.

Embodiments disclosed herein overcome the above problems of the conventional dual focal plane design with a technique whereby only a single intermediate focal plane is used at a given time. In one embodiment, the single intermediate focal plane is adjustable or translatable to coincide with different displaced reticles. Reticles that do not coincide with the adjustable sole focal plane are not in focus and therefore not viewable by the user through the eyepiece assembly. The different reticles can be positioned at different focal plane locations to correspond to different magnifying powers and may include different reticle types associated with the given magnifying power. In other embodiments, the different reticles are of the same type but are different in size to maintain a constant angular meaning between the different MPs. In one embodiment, the single intermediate focal plane is stationary, but an electronic display is used to generate an adjustable reticle. The reticle can be electronically scaled in size based on current MP or even its type changed between different MP settings. The embodiments described herein can be accomplished with conventional refractive optics or adaptive optics, and in a binary or continuous zoom scope.

Figure 2:
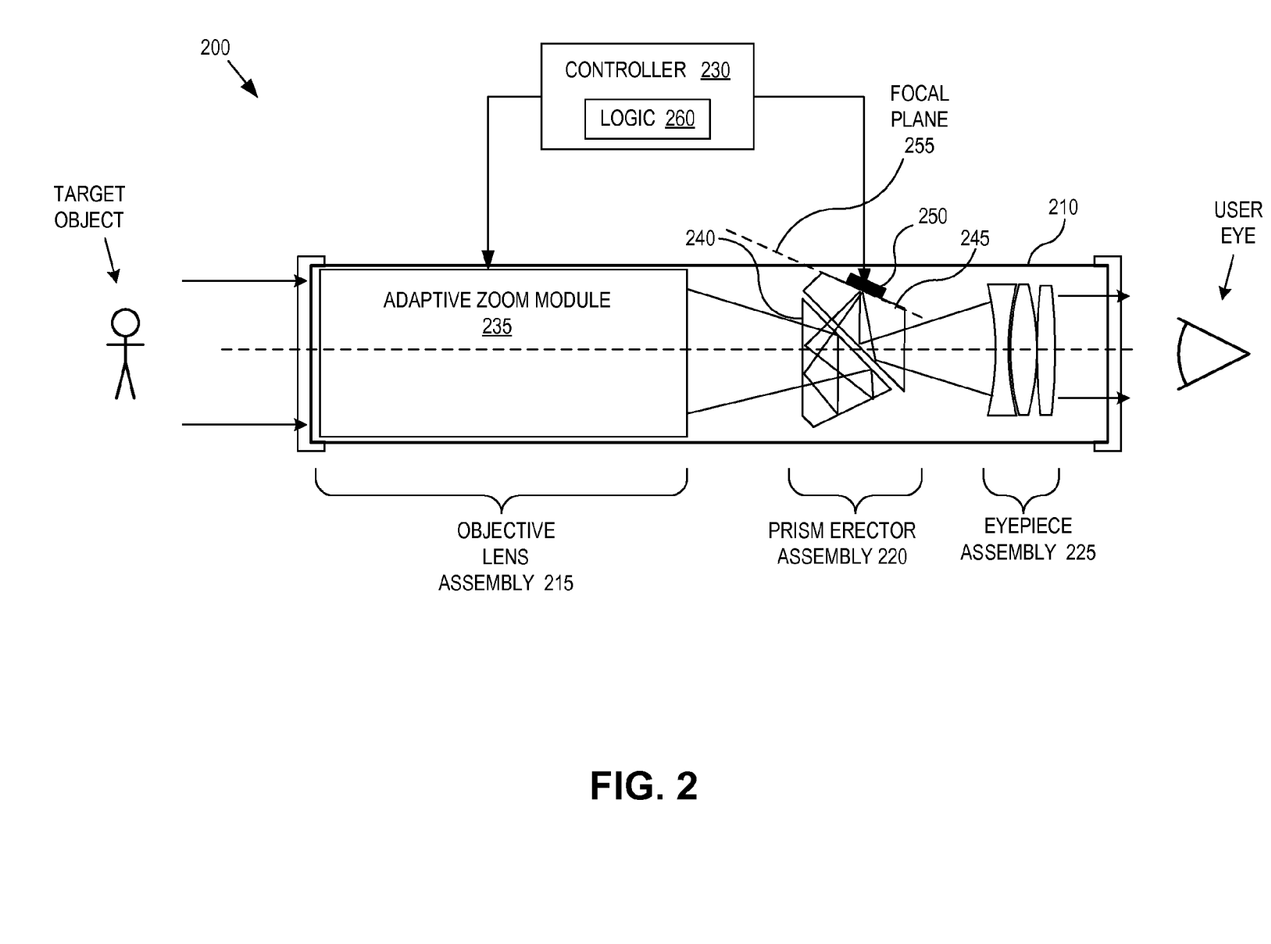
FIG. 2 is a functional block diagram of a direct view telescopic sight having a single intermediate focal plane, in accordance with an embodiment of the disclosure.

FIG. 2 is a functional block diagram of a direct view telescopic sight 200 having a single intermediate focal plane 255, in accordance with an embodiment of the disclosure. The illustrated embodiment of direct view telescopic sight 200 includes a housing 210, an objective lens assembly 215, a prism erector assembly 220, an eyepiece assembly 225, and a controller 230. The illustrated embodiment of objective lens assembly 215 includes an adaptive zoom module 235. The illustrated embodiment of prism erector assembly 220 includes prisms 240 and 245, reticle display 250, and focal plane 255. Controller 230 includes logic 260.

During operation, objective lens assembly 215 receives substantially collimated light of the object target and focuses the light onto focal plane 255 within prism erector assembly 220. Objective lens assembly 215 includes an adaptive zoom module 235 capable of adjusting the MP of direct view telescopic sight 200 while maintaining a constant location of the sole focal plane 255. The MP is zoomed by adjusting the FOV in the object direction while maintaining the size of the image brought to focus at focal plane 255. The high magnification setting uses a small FOV in the object direction while the low magnification setting uses a larger FOV. Both zoom settings are brought to a constant sized in-focus image at focal plane 255 in front of reticle display 250.

As a by-product of magnifying and focusing the object image at focal plane 255, adaptive zoom module 235 also inverts the object image. Accordingly, prism erector assembly 220 redirects the optical path via a series of reflections (e.g., odd number of reflections such as five times) within prisms 240 and 245 in a manner that re-inverts the object image to be right-side up. In addition, reticle display 250 is positioned to coincide with focal plane 255. Reticle display 250 is implemented with an electronic display. In the illustrated embodiment, the electronic display is a reflective electronic display, such as a liquid crystal on silicon ("LCOS") display. The reflective electronic display reflects the in-focus object image at focal plane 255 while also superimposing or combining the currently displayed reticle image with the object image. Since reticle display 250 is an electronic display, the size and/or type of the displayed reticle can be changed at will under control of controller 230. In one embodiment, prisms 240 and 250 are fabricated of glass.

Figure 6:
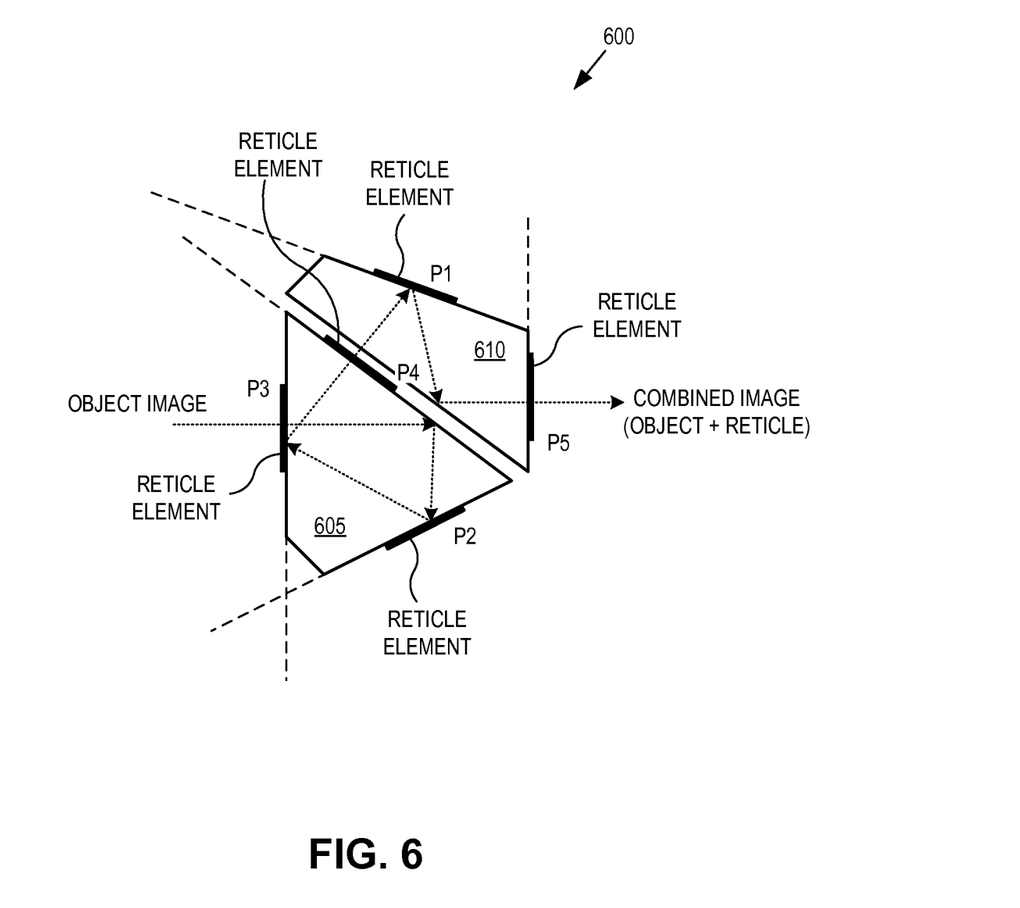
FIG. 6 illustrates a prism erector assembly having multiple reticle element positions each for alignment with a sole focal plane at a given time, in accordance with an embodiment of the disclosure.

In other embodiments, reticle display 250 may be disposed at various other surfaces of prisms 240 or 245. If reticle display 250 is positioned at a surface where the object image light is reflected (illustrated), then a reflective electronic display may be used. If reticle display 250 is positioned at a surface where the object image light is transmitted through an interface of either prism 204 or 245 (e.g., entry surface of prism 240, exit surface of prism 245, or at the interface gap between prisms 240 and 245), then a transmissive electronic display may be used (e.g., liquid crystal display). FIG. 6 illustrates the various different surfaces of a prism erector assembly at which a reticle display may be positioned. Of course, if the position of reticle display 250 is switched to a different surface of prism erector assembly 220, then the optical elements within adaptive zoom module 235 and/or the spacing between adaptive zoom module 235 and prism erector assembly 220 should be adjusted so that focal plane 255 coincides with reticle display 250.

Figure 3:
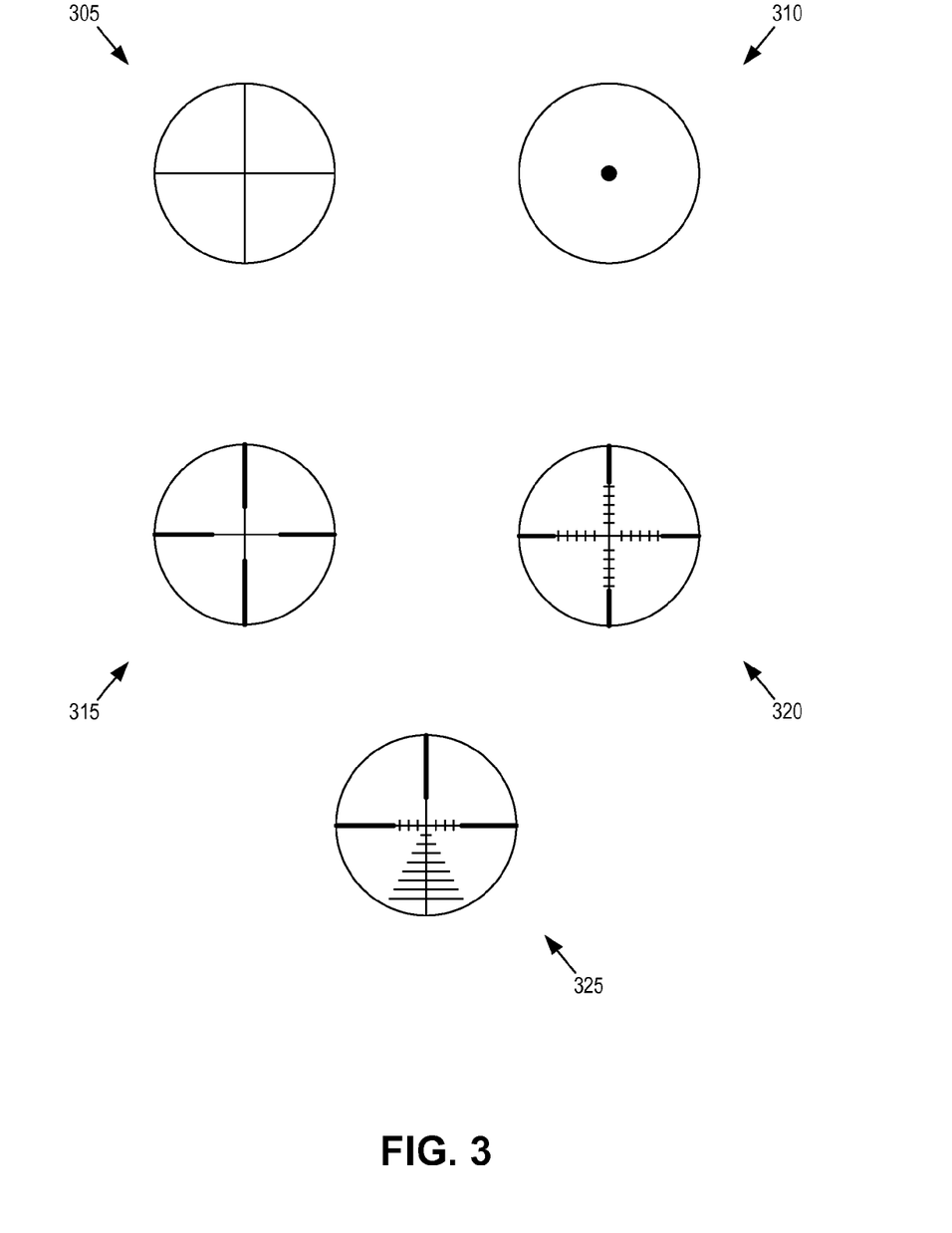
FIG. 3 illustrates various types of reticles, in accordance with embodiments of the disclosure.

FIG. 3 illustrates various non-exhaustive examples of reticle types that may be displayed by reticle display 250. The example reticle types include fine cross-hair reticle 305, target dot reticle 310, duplex reticle 315, mil-dot reticle 320, or range finding reticle 325. Of course other types of reticles may also be displayed. When zooming the MP of adaptive zoom module 235, reticle display 250 may change the reticle type depending upon the zoom setting and/or scale the size of the reticle to maintain constant angular meaning of marks within the reticle relative to the object image across the different zoom settings.

The combined reticle and object image is then emitted from the prism erector assembly 220 to eyepiece assembly 225. Eyepieces assembly 225 includes optics to displace the image at or near infinity (e.g., substantially collimate) so that the user's eye can easily bring the combined image into focus.

Controller 230 is coupled to adaptive zoom module 235 within objective lens assembly 215 and reticle display 250 to control both elements in unison. Controller 230 executes logic 260 to zoom the internal adaptive optics to change MP while maintaining a constant position of focal plane 255 while concurrently adjusting the reticle displayed by reticle display 250. Logic 260 may be implemented in software executed by a microcontroller, in hardware (e.g., ASIC, FPGA, etc.), or a combination of both. It is noteworthy that in the embodiment illustrated in FIG. 2, the adaptive optics that control the MP are all located on the objective lens assembly side of focal plane 255.

Figure 4A:
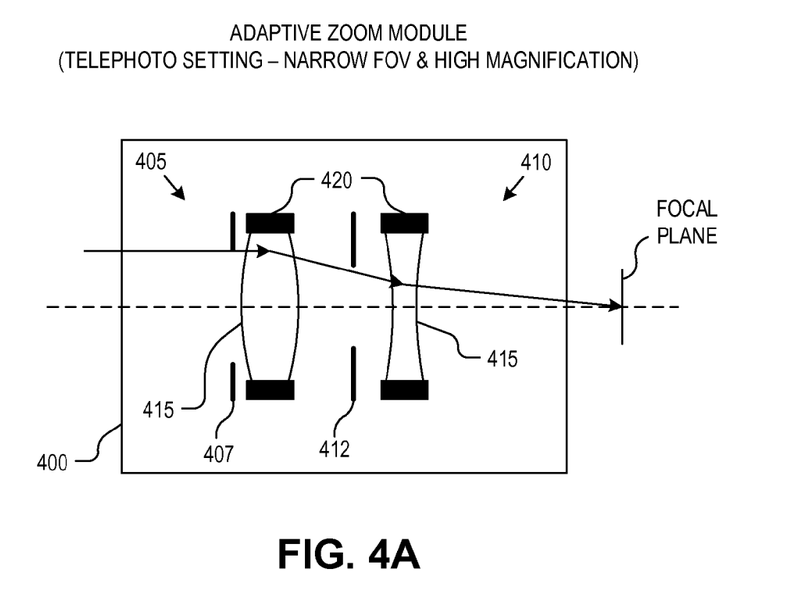
FIGS. 4A & 4B are functional block diagrams illustrating internal components of an adaptive zoom module at two different magnifying power settings, in accordance with an embodiment of the disclosure.
Figure 4B:
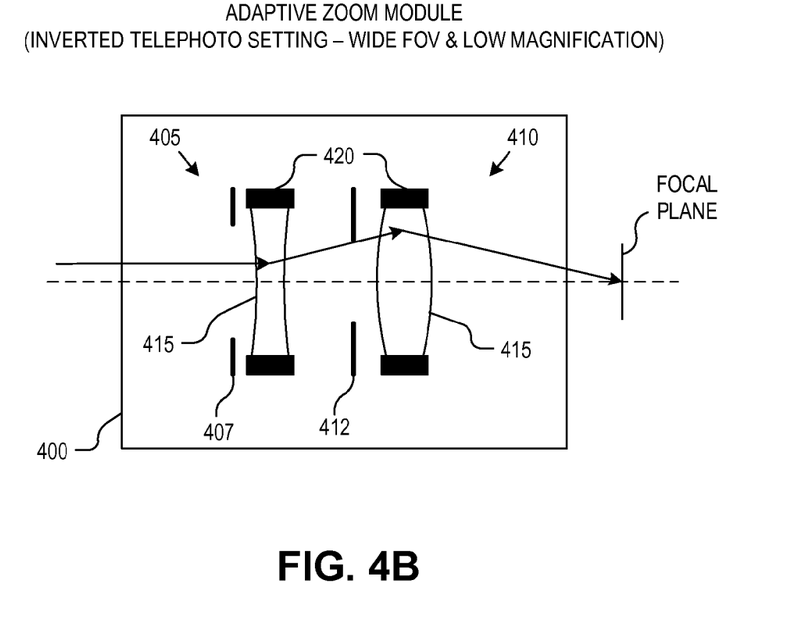

FIGS. 4A & 4B are functional block diagrams illustrating internal components of an adaptive zoom module 400 at two different operating settings, in accordance with an embodiment of the disclosure. Adaptive zoom module 400 is one possible implementation of adaptive zoom module 235 illustrated in FIG. 2. FIG. 4A illustrates a high magnification zoom setting of adaptive zoom module 400 while FIG. 4B illustrates a low magnification zoom setting of the same.

The illustrated embodiment of adaptive zoom module 400 includes adjustable lenses 405 and 410 and irises 407 and 412. Each of adjustable lenses 405 and 410 may be implemented using an electrically controlled variable focal length lens. In the illustrated embodiment, adjustable lenses 405 and 410 include a flexible lens structure 415 that is deformable under the influence of an actuator 420. For example, lens structure 415 may be a liquid lens, while actuator 420 may be a piezoelectric crystal. Other implementations may include electrostatic actuators, electro-mechanical actuators, microelectromechanical system ("MEMS") actuators, or otherwise. Lens structure 415 may be implemented as a liquid encased structure, a flexible refractive membrane structure, or otherwise. Irises 407 and 412 may be implemented as fixed irises or adjustable irises. In some embodiments, the size and/or shape of adjustable lens 405 maybe designed to inherently operate as an iris. For example, iris 407 may be an opaque structure or material disposed on adjustable lens 405. In one embodiment, the physical housing of one or both adjustable lenses 405 and 410 may operate as an iris. It should be appreciated that adaptive zoom module 400 may include other known non-adaptive optical elements (not illustrated) that compensate for various optical or chromatic aberrations.

During operation, adjustable lens 405 facing the target object is adjusted to manipulate its FOV in the object direction. To increase magnification (FIG. 4A), the FOV is reduced, while to decrease magnification (FIG. 4B), the FOV is increased. In order to maintain a constant focal distance for the overall adaptive zoom module 400, (thereby maintaining a constant location for focal plane 255), adjustable lens 410 is adjusted to compensate. The changes to adjustable lens 410 not only maintain a constant location for the focal plane, but also maintain a constant size for the object image displayed at the focal plane on the reticle element. Since the FOV in the object direction is changed while the size of the object image at the focal plane is constant, a variable MP or image zoom is achieved.

When operating in the telephoto setting (see FIG. 4A), the limiting aperture (also referred to as the "stop") is iris 407 at adjustable lens 405. When operating in the inverted telephoto setting (see FIG. 4B), the limiting aperture or stop is iris 412. Accordingly, adaptive zoom module 400 uses fixed position adjustable lenses 405 and 410, but has two different stop locations (two different limiting iris locations) dependent upon the zoom setting. In contrast, conventional telephoto scopes use only a single stop location, but move the position of the lenses between zoom settings. Rather, the embodiment disclosed in FIGS. 4A and 4B move the stop while maintaining constant axial locations for adjustable lenses 405 and 410. Changing the stop location between zoom settings help maintain a substantially constant eye relief location between zoom settings so that the user need not adjust their eye location between zoom settings. The eye relief location is the distance from the last surface of the eyepiece at which the user's eye can obtain the full viewing angle. When the user's eye is offset from the eye relief location, the viewing angle or field of view decreases. The image of the stop, created by the lenses to the left of the stop, is the "exit pupil." The size of this exit pupil is determined by m=z'/z. Just as it is desirable to maintain the exit pupil location, so is it desirable to maintain its size.

The position of irises 407 and 412 and the distance between adjustable lenses 405 and 410 can be determined according to the Gaussian Conjugate Equation 1:

$$1/z' = 1/z + f2,$$ (Equation 1)

where f2 is the focal length of adjustable lens 410, z is the distance from adjustable lens 410 to the stop or limiting aperture for the given zoom setting, and z' is the distance from adjustable lens 410 to the "image of the stop's location." The image of the stop's location (z') is an axial location between adjustable lenses 405 and 410 from which the exiting central or "chief" ray appears to be originating. The image of the stop's location (z') is fixed between both telephoto and inverted telephoto settings. In one embodiment, iris 407 can be positioned at the object side surface of adjustable lens 405 (i.e., resides approximately at the same axial location as adjustable lens 405 itself). When operating in the telephoto setting (FIG. 4A), f2 has a first known value dictated by the MP in the telephoto setting and z coincides with adjustable lens 405. Thus, Equation 1 can be solved during the telephoto setting to determine z'. When operating in the inverted telephoto setting (FIG. 4B), z' is constant across zoom settings and already determined and f2 has a second known value again based upon the MP for the zoom setting. Thus, Equation 1 can be solved again to determine the location of iris 412, which is the stop during the inverted telephoto setting.

Figure 5:
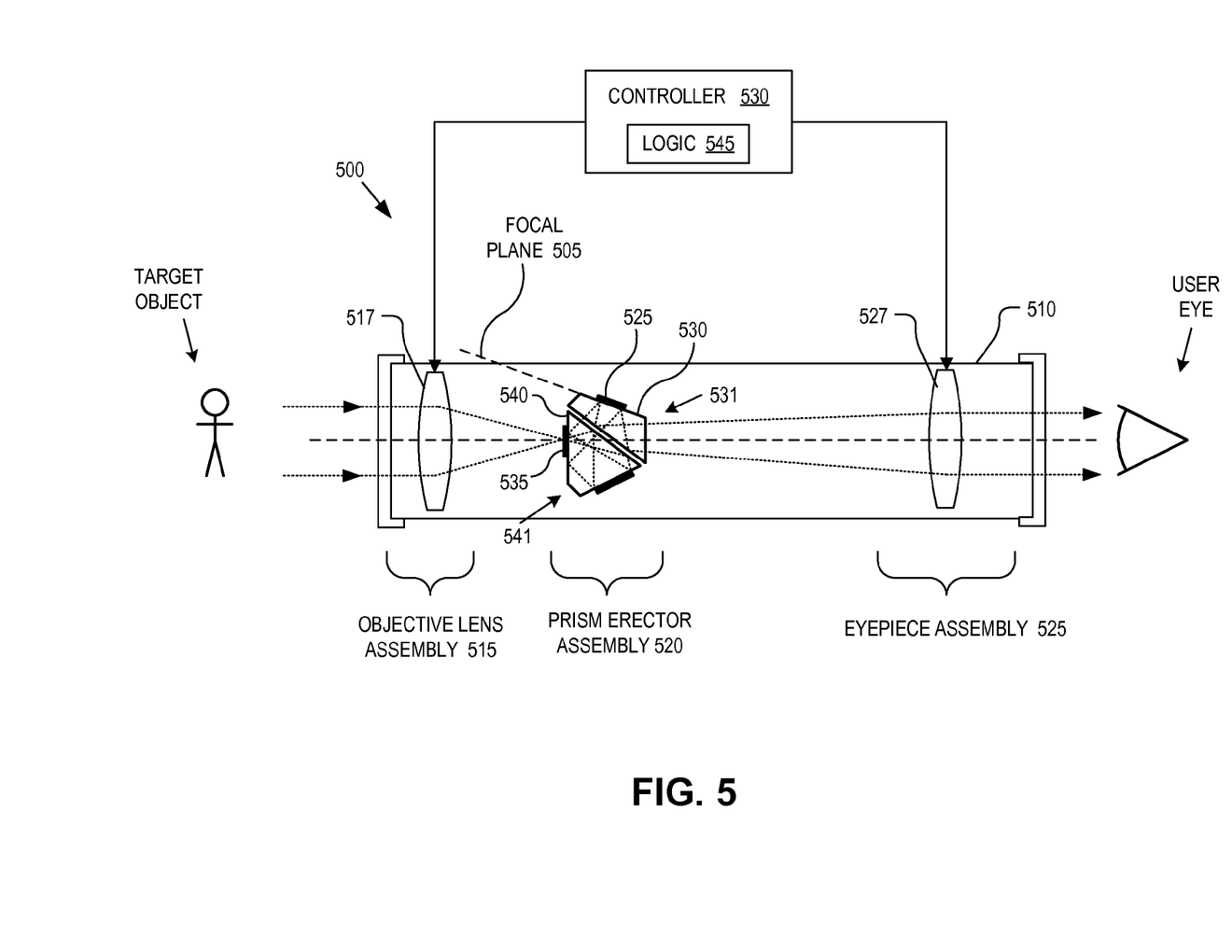
FIG. 5 is a functional block diagram of a direct view telescopic sight having a single intermediate focal plane, in accordance with an embodiment of the disclosure.

FIG. 5 is a functional block diagram of a direct view telescopic sight 500 having a single intermediate focal plane 505, in accordance with an embodiment of the disclosure. The illustrated embodiment of direct view telescopic sight 500 includes a housing 510, an objective lens assembly 515, a prism erector assembly 520, an eyepiece assembly 525, and a controller 530. The illustrated embodiment of prism erector assembly 520 includes a reticle element 525 disposed on or adjacent to surface 530 of a prism 531 and a reticle element 535 disposed on or adjacent to surface 540 of a prism 541. The illustrated embodiment of controller 530 includes logic 545. The illustrated embodiments of objective assembly 515 and eyepiece assembly 525 are implemented with adjustable lenses 517 and 527, respectively. In one embodiment, adjustable lenses 517 and 527 may be implemented with similar elements as either of adjustable lenses 405 or 410.

During operation, objective lens assembly 515 receives substantially collimated light of the object target and focuses the light onto one of reticle elements 525 or 535 at a given time. Thus, object lens assembly 515 is capable of moving the position of focal plane 505 to selectively coincide with either reticle element 525 or 535. Since each reticle element corresponding to a different focal distance, each reticle element 525 or 535 has a different MP associated with it. Whichever reticle element does not coincide with adjustable focal plane 505 at a given time, is out of focus and therefore its reticle is not viewable through eyepiece assembly 525 at that zoom setting. It is noteworthy that direct view telescopic sight 500 also includes only a single focal plane at a given time between the objective lens assembly and the eyepiece assembly.

In one embodiment, reticle elements 525 and 535 may be implemented as the same reticle type, but with a compensated size to maintain constant angular meaning of the reticle between the different zoom settings. In one embodiment, reticle elements 525 and 535 provide different reticle types that are suitable for the particular zoom setting. For example, the low MP zoom setting may be a cross-hair reticle or dot reticle, while the high MP zoom setting may be a ranging finding or mil-dot reticle. Of course, even if different reticle types are used between the different locations for alignment of the single focal plane 505, these different reticle types can also be size adjusted to maintain constant angular meaning of various reticle marks between the zoom settings.

Reticle elements 525 and 540 may be implemented using a variety of different reticle technologies, and even combinations thereof. Reticle elements 525 and 535 may be implemented as etched reticles, wire reticles, reflective electronic display reticles, transmissive electronic display reticles, halographic reticles, or otherwise. If either reticle element 525 or 535 is an electronic display reticle element, then the size and/or type of the displayed reticle may also be changed at will in response to controller 530 executing logic 545. Thus, reticle adjustment can occur contemporaneously with MP adjustment via control signals applied to adjustable lenses 517 and 527.

As a by-product of magnifying and focusing the object image at focal plane 505, objective lens assembly 515 also inverts the object image. Accordingly, prism erector assembly 520 redirects the optical path via a series of reflections (e.g., odd number of reflections such as five times) within prisms 531 and 541 in a manner that re-inverts the object image to be right side up. The reticle elements 525 and 535 superimpose or combine their reticle with the object image when the given reticle element is aligned with the single adjustable focal plane 505. In one embodiment, prisms 531 and 541 are fabricated of glass.

The combined reticle and object image is then emitted from the prism erector assembly 520 to eyepiece assembly 525. Eyepieces assembly 525 includes an adjustable lens 527 that displaces the combined image at or near infinity (e.g., substantially collimate) so that the user's eye can easily bring the combined image into focus. Since the position of focal plane 505 is adjustable, adjustable lens 527 is also coupled to controller 530 to adjust its focal distance in cooperation with the adjustments applied to adjustable lens 517 in objective lens assembly 515.

FIG. 6 illustrates a prism erector assembly 600 having multiple reticles each for alignment with a sole focal plane at a given time, in accordance with an embodiment of the disclosure. Prism erector assembly 600 is one possible implementation of either prism erector assemblies 220 or 520.

FIG. 6 illustrates how an odd number of reflections at the various surfaces of prisms 605 and 610 invert the object image received from the objective lens assembly before forwarding the combined object+reticle image to the eyepiece assembly. Furthermore, reticle elements may be positioned at any one of the five illustrate surfaces/interfaces (e.g., positions P1-P5). In one embodiment, each reflection of the image light occurs via total internal reflection ("TIR") within the prisms 605 and 610. In other embodiments, one or more of the surfaces at P1 and P2 may have a reflective coating disposed over the surface and behind the reticle element to improve the reflective properties of these surfaces and/or relax the geometric constraints on the shape of prisms 605 and 610. In some embodiments, selected interfaces/surfaces at P1-P5 may be coated with anti-reflective ("AR") coatings and/or dichroic coatings to achieve the desired reflective/transmissive characteristics.

In the case of prism erector assembly 220 (FIG. 2) only a single reticle element position is used, thought anyone of the positions illustrated in FIG. 6 may be used. In contrast, prism erector assembly 520 (FIG. 5) may use two, three, four or all five of the reticle element positions P1-P5 illustrated in FIG. 6 to provide multiple independent zoom settings. Reticle element positions P1 and P2 may be implemented using a reflective reticle element (e.g., reflective LCOS display, etched/wire reticle with mirrored backing, etc.) while reticle element positions P3-P5 may be implemented with transmissive reticle elements (e.g., LCD, etched/wire reticle on a transparent or semi-transparent surface, hologram reticle, etc.).

The operations explained above in connection with logic 260 or logic 545 are described in terms of computer software and hardware operations. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

A computer-readable storage medium includes any mechanism that provides (e.g., stores) information in a form accessible by a machine (e.g., a computer, network device, personal digital assistant, manufacturing tool, any device with a set of one or more processors, etc.). For example, a computer-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A direct view telescopic sight, comprising:
   an objective lens assembly mounted to receive collimated light of an image from an object direction and direct the light along an optical path;
   an eyepiece assembly mounted to receive the light along the optical path and to emit collimated and magnified light of the image along an eye-ward direction; and
   a prism erector assembly positioned within the optical path between the objective lens assembly and the eyepiece assembly, the prism erector assembly including:
   first and second prism elements through which the optical path passes, wherein the first and second prism elements are oriented to redirect the optical path within the first and second prism elements to invert the image propagating along the optical path between the objective lens assembly and the eyepiece assembly, and wherein surfaces of both the first and second prism elements are each coincident with a different focal plane of a plurality of focal planes; and a first reticle element disposed on, or immediately adjacent to without an intervening element having optical power, a first surface of one of the first or second prism elements to impose a first reticle on the image, wherein the first reticle element is associated with a first focal plane of the plurality of focal planes, and wherein the objective lens, eyepiece, and prism erector assemblies are coupled to bring the image into focus at only one focal plane at a given time along the optical path between the objective lens and eyepiece assemblies, and wherein the only one focal plane is positioned to be coincident with one focal plane of the plurality of focal planes at the given time.

2. The direct view telescope sight of claim 1, wherein the objective lens assembly comprises:
  a first adjustable lens having a first adjustable focal length; and
  a second adjustable lens having a second adjustable focal length.

3. The direct view telescope sight of claim 2, wherein the objective lens assembly further comprises:
  a first iris disposed adjacent to the first adjustable lens; and
  a second iris disposed between the first and second adjustable lens,
  wherein the first iris operates as a limiting aperture when the objective lens assembly is operating in a first zoom setting and the second iris operates as the limiting aperture when the object lens assembly is operation in a second zoom setting.

4. The direct view telescope sight of claim 2, wherein the first reticle element comprises a reflective electronic display, the direct view telescope sight further comprising:
  a controller coupled to control the first reticle displayed by the first reticle element and coupled to the first and second adjustable lenses to control the first and second adjustable focal lengths.

5. The direct view telescope sight of claim 1, wherein the objective lens assembly comprises a first adjustable lens having a first adjustable focal length and the eyepiece assembly comprises a second adjustable lens having a second adjustable focal length, the direct view telescope sight of claim 1, further comprising:
  a controller coupled to the first and second adjustable lenses to control the first and second adjustable focal lengths.

6. The direct view telescope sight of claim 5, wherein the prism erector assembly further comprises:
  a second reticle element, different from the first reticle element, disposed on or adjacent to a second surface of one of the first or second prism elements to impose a second reticle on the image.

7. The direct view telescope sight of claim 4, wherein the controller includes logic which when executed by the controller causes the controller to output control signals to the first reticle element and the objective lens assembly that zoom the direct view telescope sight by:
  adjusting focal lengths of the first and second adjustable lenses to change the field of view ("FOV") of the objective lens assembly in the object direction while holding the only one focal plane at the first surface of the prism erector assembly coincident with the first focal plane of the plurality of focal planes and maintaining a size of the image focused onto the only one focal plane constant; and
  adjusting a size of the first reticle displayed by the reflective electronic display while changing the FOV to maintain a constant angular meaning of marks within the first reticle relative to the image from one zoom setting to a next zoom setting.

8. The direct view telescope sight of claim 4, wherein the first and second adjustable lenses each comprise a liquid lens that adjusts shape in response to an actuator coupled to the controller.

9. The direct view telescope sight of claim 4, wherein the reflective electronic display comprises a liquid crystal on silicon ("LCOS") display.

10. The direct view telescope sight of claim 4, wherein the controller includes logic which when executed by the controller causes the controller to change a type of the first reticle displayed by the first reticle element based upon a zoom setting of the objective lens assembly.

11. The direct view telescopic sight of claim 1, wherein the only one focal plane is coincident with a given surface of the first or second prism elements.

12. The direct view telescope sight of claim 6, wherein the controller includes logic which when executed by the controller causes the controller to output control signals to the first and second adjustable lens that change a zoom factor of the direct view telescope sight by:
  adjusting the first and second adjustable focal lengths to reposition the only one focal plane from being coincident with the first focal plane associated with the first reticle element to being coincident with a second focal plane of the plurality of focal planes, wherein the second reticle element is associated with the second focal plane of the plurality of focal planes,
  wherein only a selected one of the first or second reticle elements is in-focus and viewable through the eyepiece assembly at a given time.

13. The direct view telescope sight of claim 12, wherein the prism erector assembly further comprises a third reticle element, different from the first and second reticle elements, disposed on or adjacent to a third surface of one of the first or second prism elements to impose a third reticle on the image, and wherein the controller includes further logic which when executed by the controller causes the controller to output control signals to the first and second adjustable lens that change the zoom factor of the direct view telescope sight by:
  adjusting the first and second adjustable focal lengths to reposition the one focal plane from being coincident with the second focal plane associated with the second reticle element to being coincident with a third focal plane of the plurality of focal planes, wherein the third reticle element is associated with the third focal plane.

14. The direct view telescope sight of claim 6, wherein the first and second reticle elements are etched onto the first and second surfaces.

15. The direct view telescope sight of claim 6, wherein the first reticle element comprises a reflective electronic display disposed adjacent to the first surface and the second reticle element comprises an etched reticle.

16. A method of magnifying an object image with a direct view telescopic sight, the method comprising:
  focusing substantially collimated light of the object image to one focal plane with an objective lens assembly, wherein the one focal plane is one focal plane of a plurality of focal planes;

substantially re-collimating the object image focused onto the one focal plane with an eyepiece assembly;

inverting the object image with a prism erector assembly positioned in an optical path between the objective lens assembly and the eyepiece assembly, wherein the prism erector assembly includes first and second prism elements through which the optical path passes, and wherein surfaces of the first and second prism elements are each associated with a different focal plane of the plurality of focal planes; and combining a first reticle onto the object image with a first reticle element disposed on a first surface of one of the first or second prism elements or disposed immediately adjacent to the first surface without an intervening element having optical power, wherein the first reticle element is associated with a first focal plane of the plurality of focal planes, wherein the object image is brought into focus at only the one focal plane along the optical path between the objective lens and eyepiece assemblies at a given time, and wherein the one focal plane is selected to be coincident with the first focal plane of the plurality of focal planes at the given time.

17. The method of claim 16, further comprising:
changing a zoom setting of the direct view telescopic sight by adjusting focal lengths of first and second adjustable lenses disposed within the objective lens assembly to change the field of view ("FOV") of the objective lens assembly while holding the one focal plane at the first focal plane and maintaining a size of the image focused onto the one focal plane constant.

18. The method of claim 17, further comprising:
changing an axial position of a limiting aperture when changing the zoom setting while maintaining constant locations for each of the first and second adjustable lenses when changing the zoom setting.

19. The method of claim 17, wherein the first reticle element comprises a reflective electronic display, the method further comprising:
adjusting a size of the first reticle displayed by the reflective electronic display while changing the FOV to maintain a constant angular meaning of marks within the first reticle relative to the object image from one zoom setting to a next zoom setting.

20. The method of claim 19, further comprising:
changing a type of the first reticle based upon the zoom setting.

21. The method of claim 16, further comprising:
changing a zoom setting of the direct view telescopic sight by adjusting a first focal length of a first adjustable lens disposed within the objective lens assembly and adjusting a second focal length of a second adjustable lens disposed within the eyepiece assembly to change a position of the one focal plane to be coincident with a different focal plane of the plurality of focal planes.

22. The method of claim 21, wherein changing the position of the one focal plane within the prism erector assembly comprises adjusting the one focal plane from being coincident with the first focal plane to a second focal plane of the plurality of focal planes.

23. The method of claim 22, further comprising:
superimposing a second reticle onto the object image with a second reticle element disposed on or adjacent to the second surface when the one focal plane is coincident with the second focal plane,
wherein the second reticle is different from the first reticle,
wherein the first reticle is not viewable from the eyepiece assembly when the one focal plane is coincident with the second focal plane and the second reticle is not viewable from the eyepiece assembly when the one focal plane is coincident with the first focal plane.

* * * * *